(12) United States Patent
Godwin et al.

(10) Patent No.: US 8,458,158 B2
(45) Date of Patent: Jun. 4, 2013

(54) REGIONALIZING PRINT MEDIA MANAGEMENT SYSTEM AND METHOD

(75) Inventors: Barrie Alan Godwin, Altadena, CA (US); Paul A. Marz, Studio City, CA (US); Gregory S. Head, West Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 782 days.

(21) Appl. No.: 12/039,251

(22) Filed: Feb. 28, 2008

(65) Prior Publication Data

US 2009/0222451 A1    Sep. 3, 2009

(51) Int. Cl.
    *G06F 17/30*    (2006.01)
(52) U.S. Cl.
    USPC .......................................... 707/706; 707/707
(58) Field of Classification Search
    USPC .................................. 707/637, 638
    See application file for complete search history.

(56) References Cited

U.S. PATENT DOCUMENTS

| | | | |
|---|---|---|---|
| 6,606,105 B1 | 8/2003 | Quartetti | |
| 7,149,771 B1 * | 12/2006 | Gifford | 709/203 |
| 7,149,964 B1 * | 12/2006 | Cottrille et al. | 715/234 |
| 2004/0133542 A1 | 7/2004 | Doerksen et al. | |
| 2004/0169881 A1 * | 9/2004 | Sato | 358/1.15 |
| 2004/0250275 A1 | 12/2004 | Green | |
| 2005/0010419 A1 * | 1/2005 | Pourhamid | 704/277 |
| 2005/0089306 A1 | 4/2005 | Green et al. | |
| 2005/0094968 A1 | 5/2005 | Green et al. | |
| 2005/0094972 A1 | 5/2005 | Green | |
| 2005/0097437 A1 | 5/2005 | Green et al. | |
| 2005/0097442 A1 | 5/2005 | Green | |
| 2005/0235317 A1 | 10/2005 | Green | |
| 2006/0126110 A1 * | 6/2006 | Ohara et al. | 358/1.15 |
| 2007/0044011 A1 | 2/2007 | Cottrille et al. | |
| 2007/0268513 A1 | 11/2007 | Enloe | |
| 2008/0117448 A1 * | 5/2008 | Ijams et al. | 358/1.15 |
| 2008/0235276 A1 * | 9/2008 | Erol et al. | 707/104.1 |
| 2009/0106096 A1 * | 4/2009 | Horowitz | 705/14 |
| 2010/0100438 A1 * | 4/2010 | Proto et al. | 705/14.52 |

FOREIGN PATENT DOCUMENTS

| | | |
|---|---|---|
| WO | WO2006/064049 A1 | 6/2006 |
| WO | WO2006/100304 A2 | 9/2006 |

OTHER PUBLICATIONS

"Zoo Signs Contract With SDI for Licensing its Menu Regionalisation Tool" www.zoodigitalgroup.com/index.php?option=com_content&task=view&id=59&Ite . . . , 2 pages, Jun. 4, 2007.
"Regionalization Tool: Automated Menu Creation" www.zoo-tech.com/index.php?option=com_content&task=view&id=37&Itemid=60, 2 pages, 2007.

(Continued)

*Primary Examiner* — Baoquoc N To
(74) *Attorney, Agent, or Firm* — Samuel K. Simpson; Patent Ingenuity, P.C.

(57) ABSTRACT

Systems and methods are provided for use in managing the regionalization of print media. In one system, a master data file having a plurality of different print features may be examined to identify at least one of the print features as a candidate print feature for possible modification in at least one region. For each candidate print feature, the system may receive user input to selectively establish a secondary data file for a print media campaign targeting at least the region in which the print candidate feature may be modified based, at least in part, on an existing regionalized print feature or on a requested regionalized print feature.

24 Claims, 3 Drawing Sheets

OTHER PUBLICATIONS

"Regionalization Tool: Background" www.zoo-tech.com/index.php?option=com_content&task=view&id=36&Itemid=59, 2 pages, 2007.

International Search Report mailed Mar. 10, 2010 in co-pending PCT Patent Application No. PCT/US2009/001112, 2 pages.

* cited by examiner

REGIONALIZING PRINT MEDIA MANAGEMENT SYSTEM AND METHOD

BACKGROUND

1. Field

The subject matter disclosed herein relates to data processing, and more particularly to data processing methods and systems for managing print media assets.

2. Information

Businesses and other organizations that operate in different regions will often need to develop different and sometimes unique print media campaigns to effectively and/or properly target the intended recipients of the print media. One clear example, is that text that appears in the print media may need to be translated into a language associated with the targeted region. Modifying print media may be a time consuming and expensive, especially when there are a significant number of regional differences and/or print media files involved.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Systems and methods are provided for use in managing the regionalization of print media. Businesses and other organizations that operate in different regions may, for example, employ such systems and methods to develop different and sometimes unique print media campaigns in a cost effective and/or controlled manner. The systems and methods may, for example, be used to initiate and monitor print media campaigns, identify or otherwise specify possible existing regional solutions, manage requests for additional regional information, establish preferred or otherwise acceptable regional information or practices, capture print media files, control release of print media, and/or monitor costs and expenses associated with a print media campaign.

An exemplary embodiment of a computing environment system suitable for use in implementing a regionalizing print media management system and method is described below, followed by an exemplary embodiment of a regionalizing print media management system and an exemplary embodiment of a method for regionalizing print media.

Figure 1:
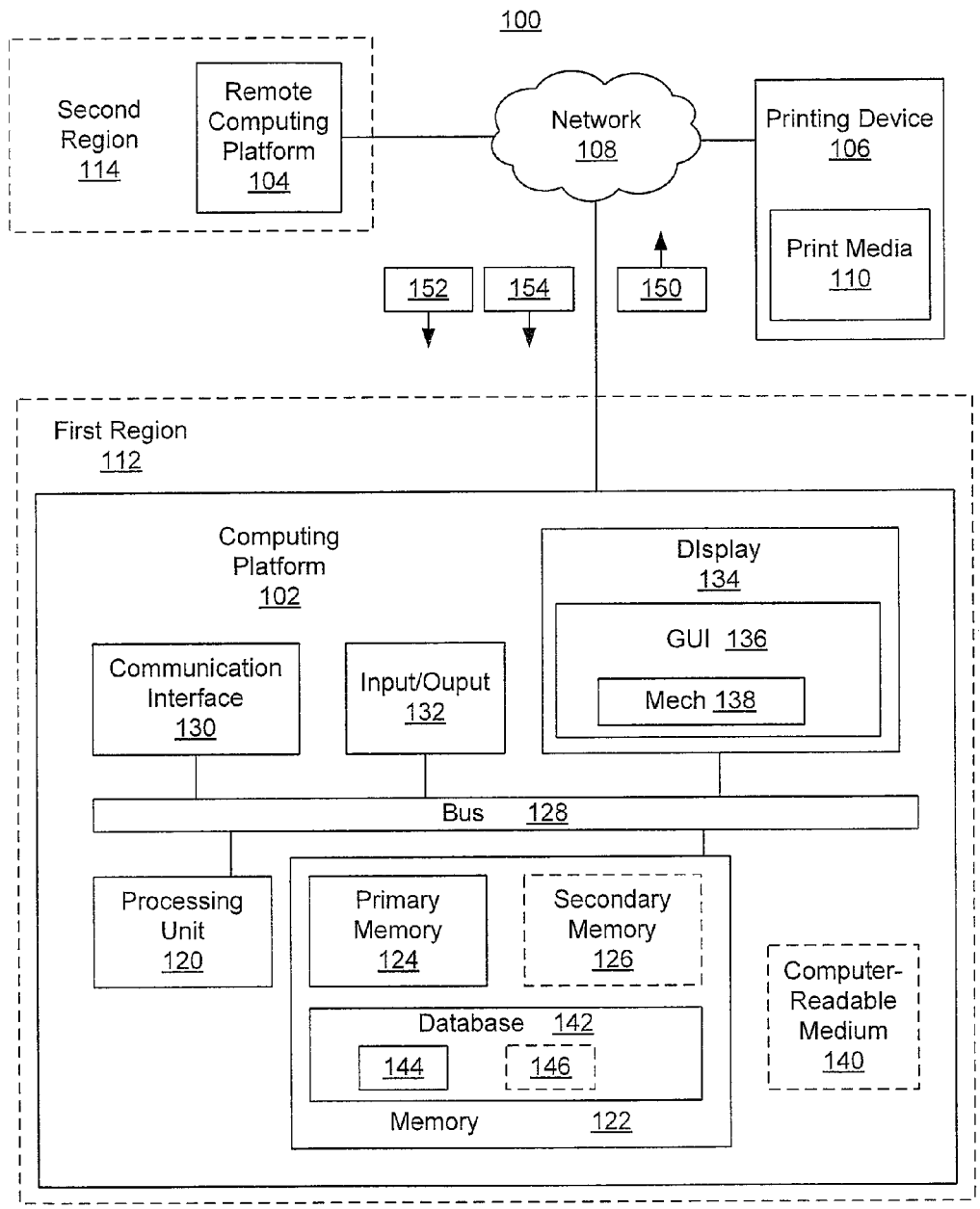
FIG. 1 is a block diagram illustrating an exemplary embodiment of a computing environment system suitable for use in implementing a regionalizing print media management system and/or method.

FIG. 1 is a block diagram illustrating an exemplary embodiment of a computing environment system 100 suitable for use in implementing a regionalizing print media management system and/or method.

Computing environment system 100 may include, for example, a computing platform 102, a remote computing platform 104 and a printing device 106, which may be operatively coupled together through a network 108.

Computing platform 102 and remote computing platform 104 as shown in FIG. 1, are each representative of any device, appliance or machine that may be configurable to exchange data over network 108. By way of example but not limitation, computing platforms 102 and/or 104 may include: one or more computing devices, such as, e.g., a desktop computer, a laptop computer, a workstation, a server device, storage units, or the like.

Network 108, as shown in FIG. 1, is representative of one or more communication links, processes, and/or resources configurable to support the exchange of data between at least two of computing platforms 102, remote computing platform 104 and printing device 106. By way of example but not limitation, network 108 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

Printing device 106 is representative of any device capable of generating or otherwise producing a print media 110. In certain examples, printing device 106 may include substantial commercial or industrial printing systems. Print media 110 is representative of any material on which, and/or with which, desired information may be applied and/or otherwise made visible.

It is recognized that all of, or part of, the various devices and networks shown in system 100, and the processes and methods as further described herein, may be implemented using or otherwise include hardware, firmware, software, or any combination thereof.

Thus, by way of example but not limitation, computing platform 102 may include at least one processing unit 120 that is operatively coupled to a memory 122 through a bus 128.

Processing unit 120 is representative of one or more circuits configurable to perform at least a portion of a data computing procedure or process. By way of example but not limitation, processing unit 120 may include one or more processors, controllers, microprocessors, microcontrollers, application specific integrated circuits, digital signal processors, programmable logic devices, field programmable gate arrays, and the like, or any combination thereof.

Memory 122 is representative of any data storage mechanism. Memory 122 may include, for example, a primary memory 124 and/or a secondary memory 126. Primary memory 124 may include, for example, a random access memory, read only memory, etc. While illustrated in this example as being separate from processing unit 120, it should be understood that all or part of primary memory 124 may be provided within or otherwise co-located/coupled with processing unit 120.

Secondary memory 126 may include, for example, the same or similar type of memory as primary memory and/or one or more data storage devices or systems, such as, for example, a disk drive, an optical disc drive, a tape drive, a solid state memory drive, etc. In certain implementations, secondary memory 126 may be operatively receptive of, or otherwise configurable to couple to, a computer-readable medium 140. Computer-readable medium 140 may, for example, include any medium that can carry and/or make accessible data, code and/or instructions for one or more of the devices in system 100.

Additionally, as illustrated in FIG. 1, memory 122 may include a database 142. As illustrated in this example, database 142 may include data such as, for example, an existing regionalized print feature 144. A requested regionalized print feature 146, may also be stored within database 142.

Computing platform 102 may include, for example, a communication interface 130 that provides for or otherwise supports the operative coupling of computing platform 102 to at least network 108. By way of example but not limitation, communication interface 130 may include a network interface device or card, a modem, a router, a switch, a transceiver, and the like.

Computing platform 102 may include, for example, an input/output 132. Input/output 132 is representative of one or more devices or features that may be configurable to accept or otherwise introduce human and/or machine inputs, for example, in support of a graphical user interface. By way of example but not limitation, input/output device 132 may include an operatively adapted speaker, microphone, keyboard, mouse, trackball, touch screen, data port, etc.

Additionally, computing platform 102 may include a display 134. As illustrated in this example, display 134 may include a graphical user interface (GUI) 136, which presents at least one user selectable mechanism 138.

As further illustrated in the example shown in FIG. 1, computing platform 102 may be in a first region 112 and remote computing platform 104 may be in a second region 114.

As used herein, the terms "region", "regionalized" and "regionalizing" are intended to broadly define that there may be a desire, and/or in certain situations there may be a requirement, for the resulting print media 110 to be different in some way depending upon the region it is being generated for. By way of example but not limitation, certain regions may have different printing standards, requirements, capabilities, materials, etc. By way of example but not limitation, certain regions may have different audiences, readers, viewers, cultures, languages, preferences, markets, etc. By way of example but not limitation, some regions may be associated with a geographical boundary, a political boundary, etc.

Herein, examples are provided in which one or more print features associated with one or more print media may be modified or regionalized accordingly. Thus, for example, as described in greater detail below certain portions of a master data file for a print media campaign targeting a first region may be modified to create a secondary data file for a second print media campaign targeting a second region.

Figure 2:
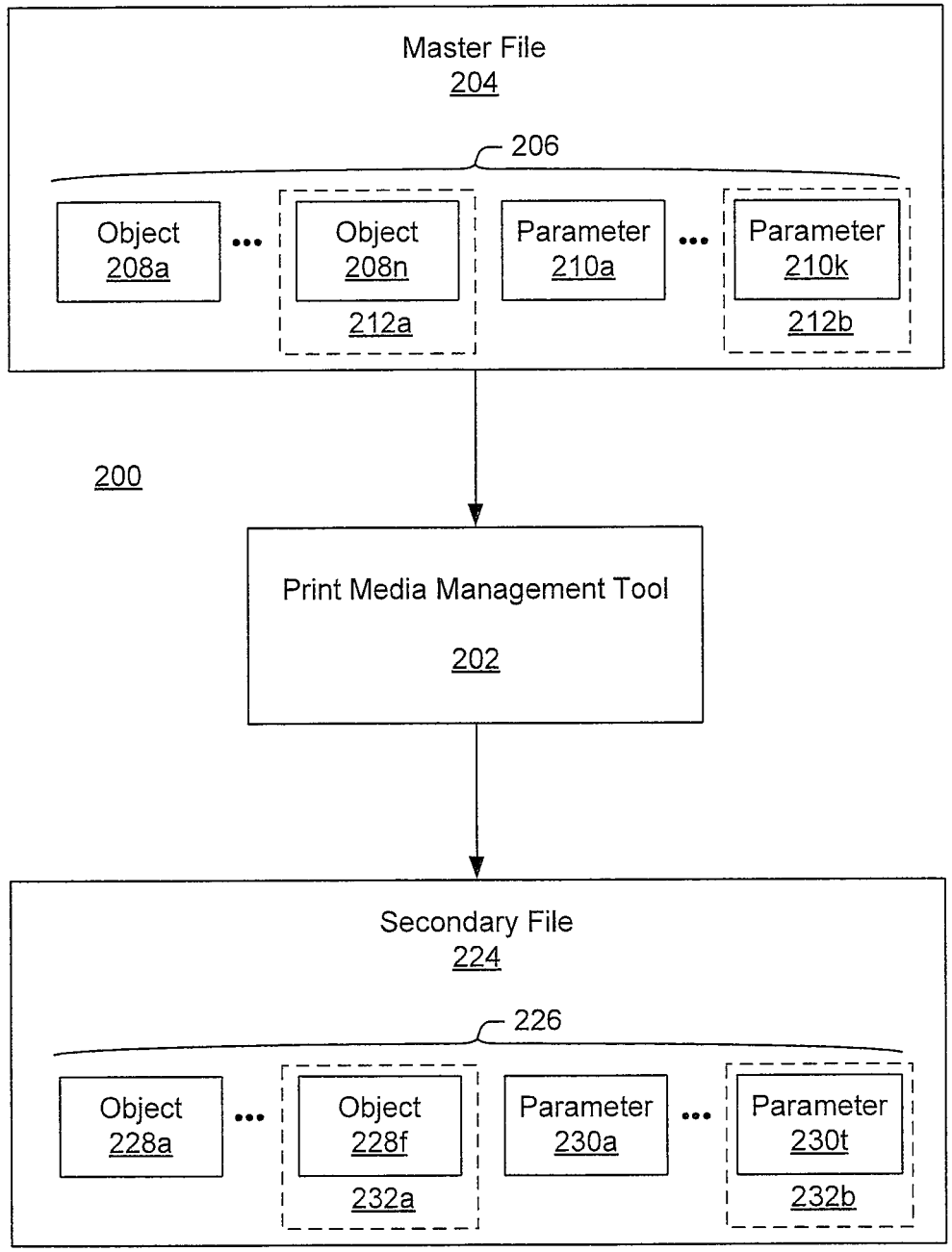
FIG. 2 is a block diagram illustrating an exemplary embodiment of a regionalizing print media management system.

Reference is now made to FIG. 2, which is block diagram illustrating an exemplary embodiment of a regionalizing print media management system 200 that includes a print media management tool 202. Print media management tool 202 may, for example, be provided through one or more computing platforms in FIG. 1.

As illustrated, at least one master file 204 may be accessed by print media management tool 202 and at least one secondary file 224 may be established by print media management tool 202. Master file 204 may, for example, include several different print features 206 such as, printable objects 208*a-n* (e.g., text objects, graphic objects, image objects, vector-based objects etc.), and/or print control parameters 210*a-k*. Master file 204 may, for example, be associated with a computer application or other like device that abstracts or otherwise logically and/or operatively associates one or more print features into layers or levels. By way of example but not limitation, master file 204 may include data from various imaging and/or publishing applications such as, Adobe Photoshop, Adobe Illustrator, Adobe In Design, QuarkXPress, Microsoft Word, or the like. In this example, printable object 208*n* is associated with a layer 212*a* and print control parameter 210*k* is associated with another layer 212*b*.

As illustrated, the resulting "regionalized" secondary file 224 may, for example, include several different print features 226 such as, printable objects 228*a-f*, and/or print control parameters 230*a-t*. In this example, printable object 228*f* is associated with a layer 232*a* and print control parameter 230*t* is associated with another layer 232*b*. Secondary file 224 may include the same or different print features and/or layers than master file 204.

Figure 3:
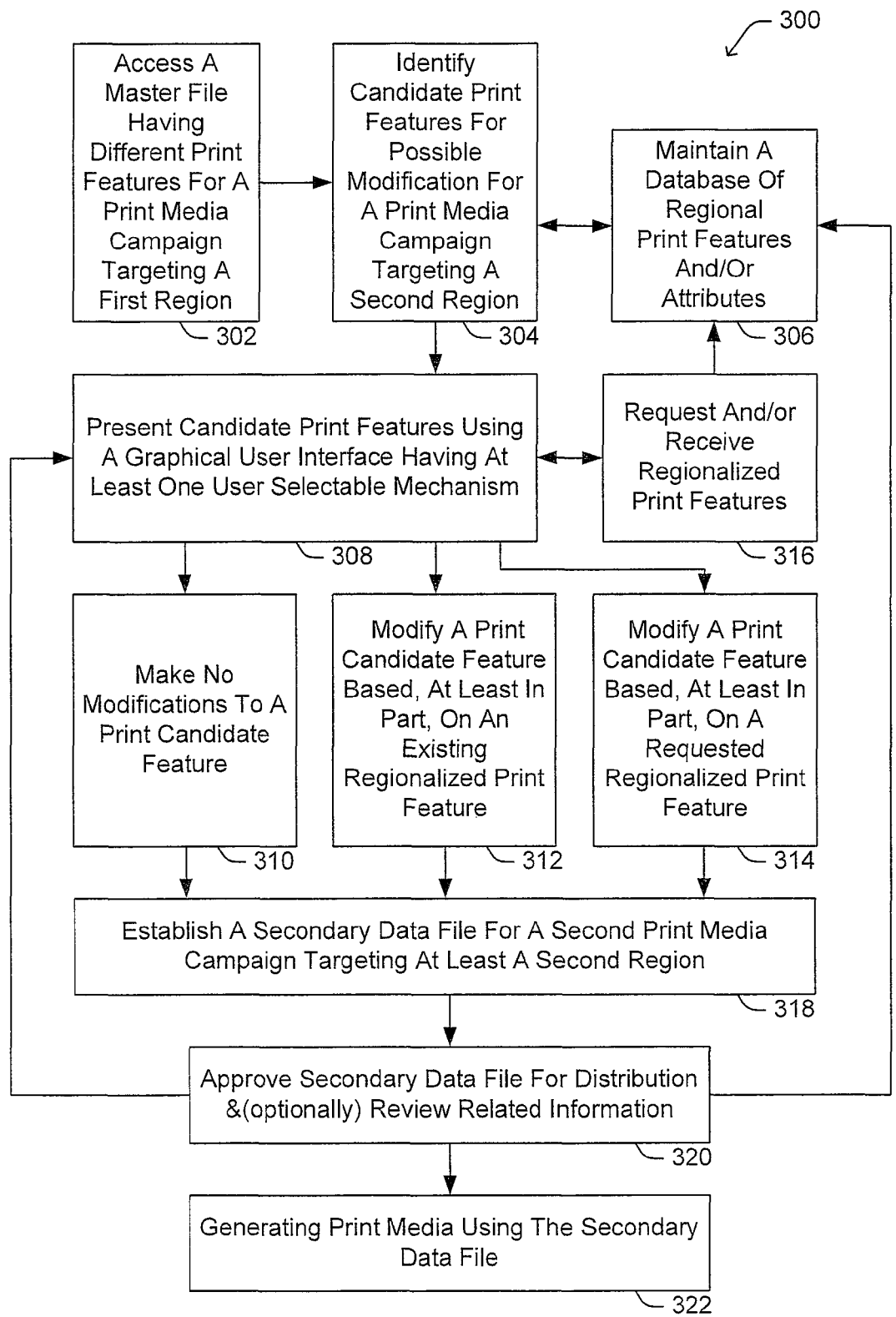
FIG. 3 is a flow diagram illustrating an exemplary embodiment of a method for regionalizing print media.

Reference is now made to FIG. 3, which is a flow diagram illustrating an exemplary method 300 for regionalizing print media, for example, using print media management tool 202.

Method 300 may, for example, be adapted for use in computing environment 100 to manage print media campaigns across different regions. At block 302 at least one master data file is accessed. The master data file may be created or otherwise established prior to or as part of block 302. The master file accessed at block 302 may include or otherwise identify a plurality of different print features. The master file may be associated with a print media campaign targeting at least a first region.

By way of example but not limitation, the different print features may include one or more printable objects such as a text object, a graphic object, an image object, vector-based object, and/or other like object. A graphic object or an image object, for example, may include an icon or the like, and in particular a regionalized icon or the like.

By way of example but not limitation, the different print features may include one or more print control parameters such as a parameter associated with the print medium, a marking parameter (e.g., associated with the ink, toner, or other marking material), a color or tone parameter (e.g., associated with one or more colors or tones), a size or shape parameter associated with the initial and/or final print media product, an orientation parameter, a print handling parameter (e.g., associated with additional printer and/or other machine or manual handling process), a security parameter, and/or other like printing control parameters or related information.

At block 304, at least one of the plurality of print features in the master data file is identified as being a candidate print feature for possible modification in at least the second region. At block 304, for example, the print features in the master file may be identified and compared with one or more print feature attributes as provided and/or maintained in a database or other like memory as at block 306. Thus, for example, at block 304 a text object identified in the master file may be compared to or otherwise analyzed based on one or more print feature attributes in the database to determine whether the text object is a candidate for possible modification.

In one example, a master file may be associated with a print media campaign targeting a first region that includes the United States and the second region may include France. Here, at block 304 the print feature attributes in the database may specify a need to translate a text object from English to French for such a regional change. Thus, for example, at block 304 the text objects "New York City" and "Produced by" may each be identified as candidate print features for possible modification.

In another example, the same master file may include a graphic object, image object and/or print control parameter that includes or otherwise specifies a color that is known to be disfavored in the second region. Here, for example, at block 304 the print feature attributes in the database may specify a need to modify the print feature for the second region for print features having sufficient color to exceed a threshold. Thus, at block 304 the graphic or image object and/or print control parameter may each be identified as candidate print feature for possible modification.

At block 308, the identified candidate print features may be presented or otherwise identified through at least one a graphical user interface that may include one or more user selectable mechanisms. At block 310, the user selectable mechanism may, for example, allow a user to initiate or otherwise specify that no modification of the print candidate feature is desired. Returning to the earlier example, at block 310 the user may select that no changes are needed for the text object "New York City".

At block 312, the user selectable mechanism may, for example, allow a user to initiate or otherwise specify that the print candidate feature is to be modified based, at least in part, on an existing regionalized print feature. Again returning to the earlier example, at block 312 the user may select that an existing translation in the database is proper for the text object "Produced by". Such existing translation and/or other variations may, for example, be automatically presented in the graphical user interface.

At block 314, the user selectable mechanism may, for example, allow a user to initiate or otherwise specify that the print candidate feature is to be modified based, at least in part, on a requested regionalized print feature. Once again returning to the earlier example, at block 314 the user may select to request a translation for the text object "Produced by".

Such a selection per block 314, may, for example, lead to block 316 wherein a request for regionalized print features may be initiated and/or regionalized print features may be received. By way of example but not limitation, with reference to FIG. 1, data 150 may be provided by computing platform 102 to remote computing platform 104 identifying the need for or otherwise the requesting one or more regionalized print features. By way of example but not limitation, also with reference to FIG. 1, data 152 may be provided by remote computing platform 104 to computing platform 102 identifying or otherwise providing the requesting one or more regionalized print features.

With reference again to FIG. 3, the resulting regionalized print features from block 316 may be added to or otherwise considered in some manner at block 306 in updating and/or maintaining the database of regional print features and/or attributes.

As a result of blocks 308, 310, 312, 314, and/or 316, at block 318, a secondary data file may be established for the second print media campaign targeting at least the second region. At block 320, the secondary data file from block 318 may be reviewed, for example, to determine if the secondary data file may produce acceptable print media. The graphical user interface of block 308 may provide for such approval and/or one or more other graphical user interfaces or the like may be used. Additionally, block 320 may include allowing for further request/retrieval and/or presentation of related information such as, for example, financial information related to all or part of the processes in method 300. By way of example but not limitation, with reference to FIG. 1, data 154 may be provided by remote computing platform 104 and/or printing device 106 to computing platform 102 identifying or otherwise providing various related information.

If the secondary data file is disapproved, for example, at block 320, then method 300 may return to block 308 as illustrated such that additional modifications may be considered. Also, as illustrated, information from block 320 may be added to or otherwise considered in some manner at block 306 in updating and/or maintaining the database of regional print features and/or attributes.

At block 322, print media may be generated using the secondary data file. Thus, for example, block 322 may include providing the secondary data file to printing device 106.

In certain implementations, one or more of the processes in method 300 may be performed using one or more computing platforms. Thus, for example, computing platforms 102 and 104 may be used together in method 300 to provide a network or web-based system that allows for collaboration and/or provides for a controlled workflow and environment. For example, the graphical user interface of block 308 and/or database of block 306 may be adapted and shared or otherwise made accessible to multiple users.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method for use in a networked computing environment to manage print media campaigns across different regions, the method comprising:

accessing a master data file comprising a plurality of different print features; and establishing a secondary data file for a print media campaign targeting at least one geographic region based, at least in part, on said master data file by:

identifying at least one of said plurality of print features in said master data file as being a candidate print feature for modification in the at least one geographic region; and for each said candidate print feature, receiving user input from a graphical user interface to at least selectively initiate:

modifying said print candidate feature based, at least in part, on an existing geographic regionalized print feature that corresponds to the at least one geographic region, or modifying said print candidate feature based, at least in part, on a requested geographic regionalized print feature that corresponds to the at least one geographic region.

2. The method as recited in claim 1, further comprising generating print media using said secondary data file.

3. The method as recited in claim 1, wherein at least one of said different print features comprises print data for at least one printable object selected from a group of printable objects comprising a text object, a graphic object, an image object, and a vector-based object.

4. The method as recited in claim 1, wherein at least one of said different print features comprises at least one print control parameter selected form a group of print control parameters comprising a print medium parameter, a marking parameter, a color parameter, a tone parameter, a size parameter, a shape parameter, an orientation parameter, a print handling parameter, and a secure parameter.

5. The method as recited in claim 1, wherein modifying said print candidate feature based, at least in part, on said requested regionalized print feature comprises requesting said requested regionalized print feature.

6. The method as recited in claim 1, wherein modifying said print candidate feature based, at least in part, on said requested regionalized print feature comprises receiving said requested regionalized print feature.

7. The method as recited in claim 1, wherein modifying said print candidate feature based, at least in part, on said requested regionalized print feature comprises storing said requested regionalized print feature to a database.

8. The method as recited in claim 1, wherein modifying said print candidate feature based, at least in part, on said existing regionalized print feature comprises retrieving said existing regionalized print feature from a database.

9. The method as recited in claim 1, wherein said graphical user interface further allows a user to at least selectively initiate that said print candidate feature remain unmodified.

10. The method as recited in claim 1, wherein said master data file comprises at least one printable object associated with at least one layer of a multiple layered document.

11. The method as recited in claim 1, wherein said graphical user interface further allows a user to at least selectively approve of said secondary data file.

12. The method as recited in claim 1, wherein said graphical user interface further allows a user to at least review financial information associated with establishing said secondary data file.

13. A system to manage print media campaigns across different regions, the system comprising:
at least one computing platform adapted to:
examine a master data file comprising a plurality of different print features to identify at least one of said plurality of print features in said master data file as being a candidate print feature for modification in at least one geographic region; and
for each said candidate print feature, receive user input from a graphical user interface to selectively establish a secondary data file for a print media campaign targeting the at least one geographic region in which said print candidate feature is modified based, at least in part, on an existing geographic regionalized print feature that corresponds to the at least one geographic region, or on a requested geographic regionalized print feature that corresponds to the at least one geographic region.

14. The system as recited in claim 13, further comprising a printing device operatively coupled to said computing platform and adapted to receive said secondary data file therefrom and to generate print media based thereon.

15. The system as recited in claim 13, wherein at least one of said different print features comprises print data for at least one printable object selected form a group of printable objects comprising a text object, a graphic object, an image object, and a vector-based object.

16. The system as recited in claim 13, wherein at least one of said different print features comprises at least one print control parameter selected form a group of print control parameters comprising a print medium parameter, a marking parameter, a color parameter, a tone parameter, a size parameter, a shape parameter, an orientation parameter, a print handling parameter, and a security parameter.

17. The system as recited in claim 13, further comprising:
a second computing platform operatively coupled to said at least one computing platform, and wherein said at least one computing platform is adapted to request said requested regionalized print feature from said second computing platform.

18. The system as recited in claim 13, further comprising:
a second computing platform operatively coupled to said at least one computing platform, and wherein said at least one computing platform is adapted to receive said requested regionalized print feature from said second computing platform.

19. The system as recited in claim 13, further comprising:
a database operatively coupled to said at least one computing platform, and wherein said at least one computing platform is adapted to provide said requested regionalized print feature to said database for storage therein.

20. The system as recited in claim 13, further comprising:
a database operatively coupled to said at least one computing platform, and wherein said at least one computing platform is adapted to receive said existing regionalized print feature from said database.

21. The system as recited in claim 13, wherein said graphical user interface further allows a user to at least selectively initiate that said print candidate feature remain unmodified.

22. The system as recited in claim 13, wherein said graphical user interface further allows a user to at least selectively approve of said secondary data file.

23. The system as recited in claim 13, wherein said graphical user interface further allows a user to at least review financial information associated with establishing said secondary data file.

24. The system as recited in claim 13, wherein said master data file comprises at least one printable object associated with at least one layer of a multiple layered document.

* * * * *